United States Patent [19]
Berry

[11] 3,923,350
[45] Dec. 2, 1975

[54] PRECISION BEARING ASSEMBLY
[75] Inventor: Samuel M. Berry, Dallas, Tex.
[73] Assignee: Commercial Metals Company, Dallas, Tex.
[22] Filed: Mar. 11, 1974
[21] Appl. No.: 449,922

[52] U.S. Cl. ............................. 308/174; 308/189
[51] Int. Cl.² ........................................ F16C 19/04
[58] Field of Search ........... 308/188 R, 189 R, 202, 308/207 R, 216, 174, 188, 189, 207, 175

[56] References Cited
UNITED STATES PATENTS

| | | | |
|---|---|---|---|
| 2,040,489 | 5/1936 | Large | 308/174 |
| 2,094,251 | 9/1937 | Young | 308/174 |
| 3,424,507 | 1/1969 | Rollins et al. | 308/174 |

Primary Examiner—M. Henson Wood, Jr.
Assistant Examiner—Richard A. Bertsch
Attorney, Agent, or Firm—Pravel & Wilson

[57] ABSTRACT

A precision bearing assembly wherein a ball-roller water pump bearing is pressed into a steel sleeve to remove all excess clearance in the bearing and thereby provide a precision bearing assembly.

3 Claims, 2 Drawing Figures

PRECISION BEARING ASSEMBLY

BACKGROUND OF THE INVENTION

1. Field of the Invention:

The present invention relates to precision bearing assemblies and particularly to a ball-roller type water pump bearing assembly.

2. Description of the Prior Art:

The prior art has not solved the problem of economically providing a precision bearing for rotating a shaft very accurately on its designed center line with very little deflection with load and with very low end-play, particularly within high temperature ranges. Ball-roller water pump bearings are non-precision bearings, produced in large quantities and thus relatively inexpensive, especially when compared to the cost of precision bearings. However, such water pump bearings do not provide the precision required for accurately holding a shaft on its designed center line with very little deflection with load and with very low end-play. The bearings which typically provide such precision for rotating shafts are relatively expensive when compared to the high production type water pump bearings.

A further ramification of this problem is encountered in mounting water pump type bearings in aluminum housings. For example, if a water pump bearing is heat-shrunk into an aluminum housing with a sufficient interference fit to remove all internal clearances from the bearing, when the aluminum cools with the bearing in place, the aluminum yields rather than compressing the bearing. Thus, the precision desired in the bearing arrangement is lost.

SUMMARY OF THE INVENTION

The present invention provides a new and improved bearing assembly comprising a steel sleeve pressed onto a non-precision ball-roller bearing known generally as a water pump bearing to provide a precision bearing from what is normally not a precision bearing. Further, an object of the present invention is to provide a new and improved precision bearing assembly wherein a standard ball-roller water pump bearing is pressed into a steel sleeve to remove all excess clearance from the bearing and the sleeve and bearing combination is then heat-shrunk into an aluminum housing with a very light interference fit between the steel sleeve and the aluminum housing which is sufficient to hold the bearing in the housing at the proper location. Thus, a precision ball-roller water pump type bearing may thus be lodged in an aluminum housing so as to provide a bearing which will rotate a shaft very accurately on its designed centerline with very little deflection with load and very little end-play.

DESCRIPTION OF THE PREFERRED EMBODIMENT

Figure 1:
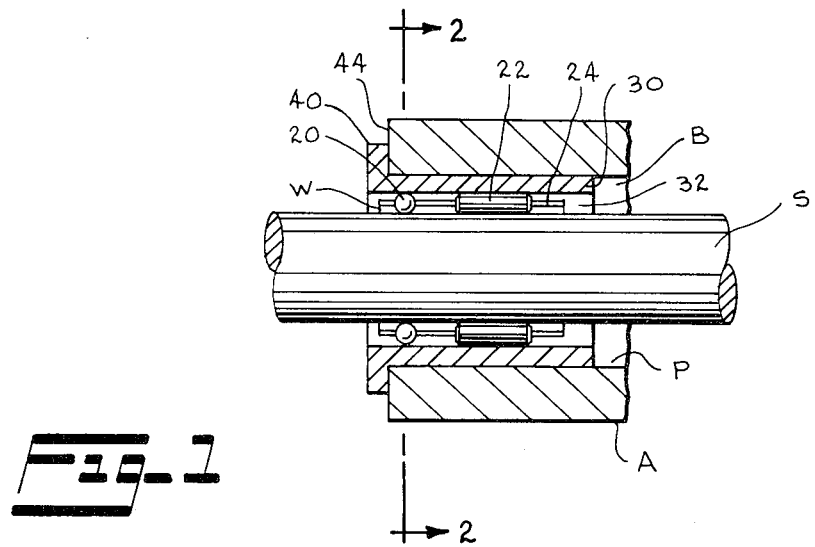
FIG. 1 is a side elevation partly in section showing a ball-roller water pump bearing pressed into a steel sleeve mounted in an aluminum housing.
Figure 2:
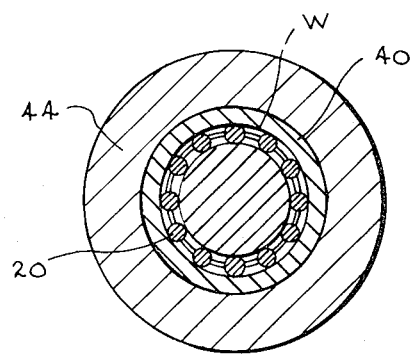
FIG. 2 is a sectional view taken along line 2 – 2 of FIG. 1 illustrating the water pump bearing mounted on the shaft.

The precision ball-roller type water pump bearing of the present invention is illustrated in FIGS. 1 and 2 of the drawings. As shown in FIG. 1, a shaft S is rotatably mounted in the bearing B which is positioned in a suitable opening or passage P in an aluminum or other relatively soft housing A. The precision bearing B of the present invention comprises a ball-roller water pump bearing W which includes the balls 20, rollers 22 and an inner race 24 which holds the balls and rollers in place around shaft S. As shown, the water pump bearing W is pressed into a steel sleeve 30 having a passage 32 extending therethrough. Such steel sleeve is provided with an annular shoulder 40 which engages a shoulder 44 on the aluminum housing A to position the bearing B in the opening P.

It will be appreciated that the press fit between the water pump bearing W and the inner surface of the surrounding steel sleeve 30 is such that substantially all clearance is removed from the water pump bearing W. That is to say, that the clearance in the bearing is limited to approximately ±0.0001 in. to substantially eliminate deflection under load and end-play in the bearing.

Also, in the preferred form of this invention, the steel sleeve 30 is inserted into the opening P in the aluminum housing A so as to provide an interference fit between such aluminum housing A and the steel sleeve 30. Preferably, the the aluminum housing is heated and the steel sleeve inserted therein so that when the aluminum cools, it will shrink to create the interference fit between the aluminum and the steel. However, it must be remembered that the interference fit between the steel sleeve 30 and the surrounding aluminum housing A must be well within the yield strength of the aluminum.

It has been found that a slight interference fit is sufficient for holding the steel sleeve in place in the aluminum housing and that the steel sleeve provides means for rendering an otherwise non-precision ball-roller water pump bearing a precision bearing with very slight clearance that substantially eliminates end-play and deflection under load.

The present invention provides a new and improved low-cost, high-production precision bearing assembly utilizing a generally non-precision ball-roller water pump bearing.

The foregoing disclosure and description of the invention are illustrative and explanatory thereof, and various changes in the size, shape, and materials as well as in the details of the illustrated construction may be made without departing from the spirit of the invention.

I claim:

1. A precision bearing assembly comprising:
   a. a steel sleeve having an opening therethrough for receiving a ball-roller bearing;
   b. a ball-roller bearing having an inner race for receiving a shaft and a plurality of ball bearings and roller bearings spaced circumferentially about the inner race with such ball bearings pressed into the opening in said steel sleeve to provide radial compression on said balls and rollers so as to remove substantially all clearance from said ball-roller bearing, so that deflection under load and end-play of said bearing are substantially eliminated.
2. The invention of claim 1, including:
   a housing made of a material having a yield strength less than that of the steel sleeve.
3. The invention of claim 2, including:
   an annular shoulder on said steel sleeve for positioning said sleeve in a suitable opening in said housing.

* * * * *